United States Patent
Walls

(10) Patent No.: US 6,956,610 B1
(45) Date of Patent: Oct. 18, 2005

(54) SHOCK MOUNTING SYSTEM FOR CCD CAMERA

(75) Inventor: Robert R. Walls, Santa Barbara, CA (US)

(73) Assignee: Linvatec Corporation, Largo, FL (US)

( * ) Notice: Subject to any disclaimer, the term of this patent is extended or adjusted under 35 U.S.C. 154(b) by 0 days.

(21) Appl. No.: 09/252,330

(22) Filed: Feb. 18, 1999

(51) Int. Cl.$^7$ ............................................. H04N 5/225
(52) U.S. Cl. ....................... 348/340; 348/375; 348/337
(58) Field of Search ................... 348/207.99, 335, 348/336, 337, 340, 373, 374, 375, 65, 225; 600/160

(56) References Cited

U.S. PATENT DOCUMENTS

| | | | |
|---|---|---|---|
| 4,933,752 A | * | 6/1990 | De Rooij .................... 348/336 |
| 5,153,734 A | * | 10/1992 | Kanamori et al. .......... 348/340 |
| 5,868,664 A | | 2/1999 | Speier et al. |
| 5,910,816 A | * | 6/1999 | Fontenot et al. ............... 348/65 |
| 6,280,378 B1 | * | 8/2001 | Kazuhiro et al. ........... 600/160 |

* cited by examiner

Primary Examiner—Tuan Ho
(74) Attorney, Agent, or Firm—Gene Warzecha

(57) ABSTRACT

A shock mounting system for a 3-chip video camera. The system comprises a pair of support plates for spanning the junctions between the various components (prisms, etc.) of a standard charge coupled device (CCD) color camera having 3 CCD's, and an elastomeric boot molded to fit between the CCD camera assembly and the housing within which it is situated. The support plates are made of a material having similar thermal characteristics to the CCD assembly and are suspended within the elastomeric boot.

12 Claims, 5 Drawing Sheets

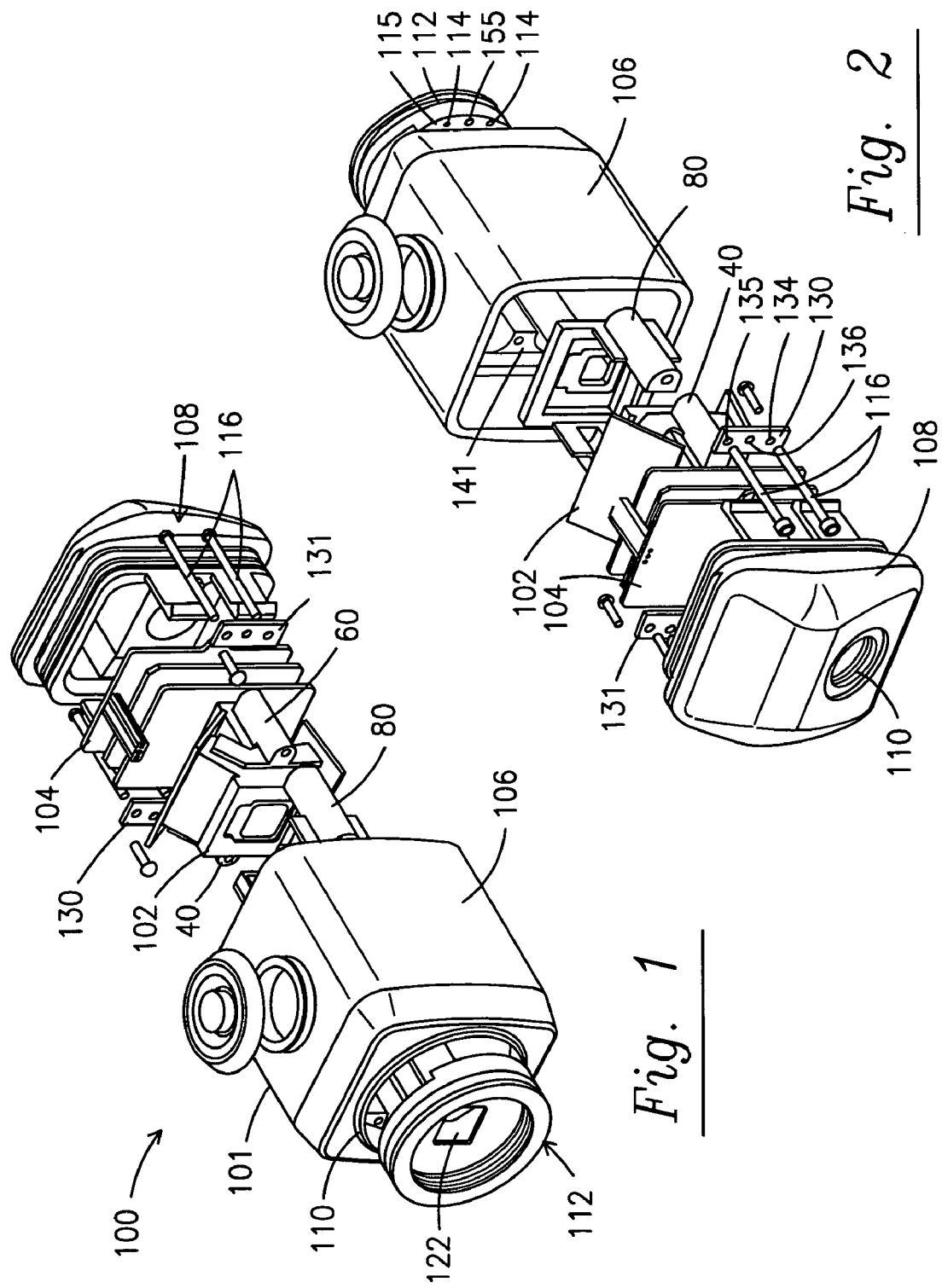

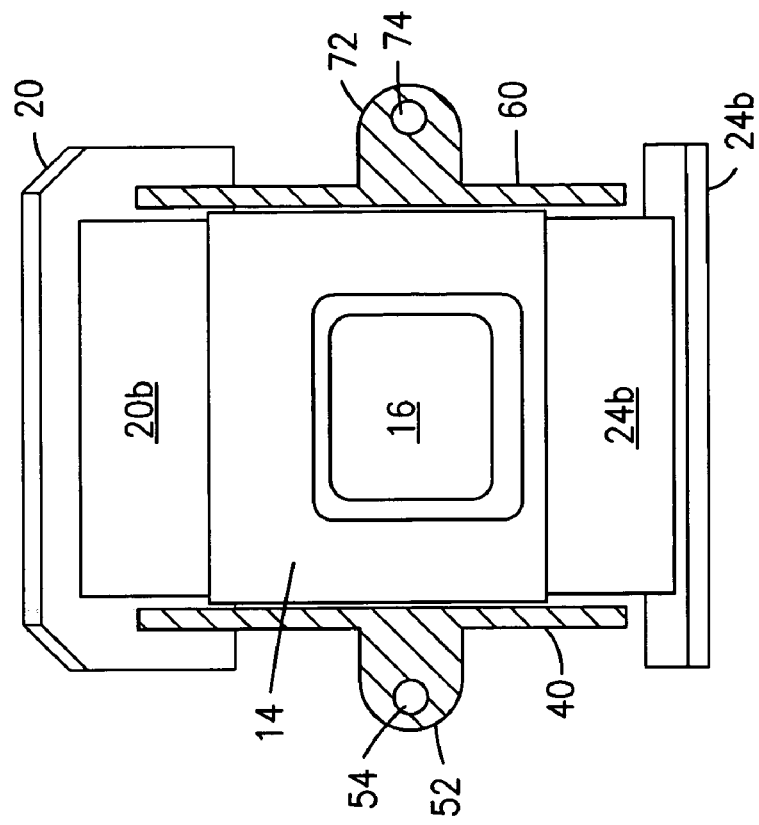
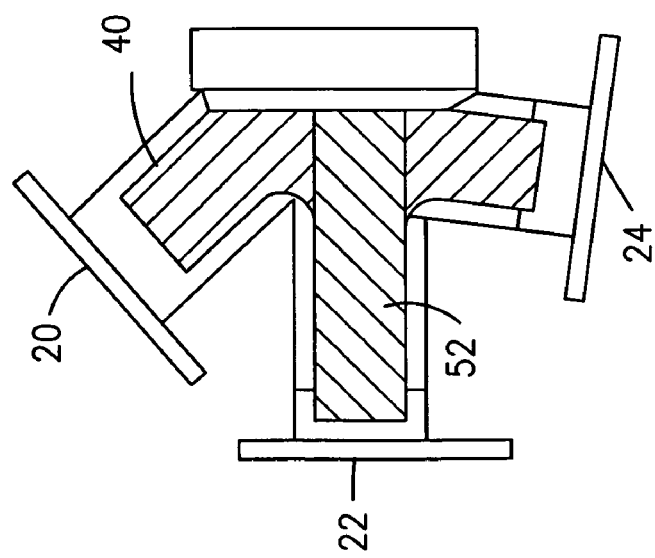
Fig. 8
Fig. 7

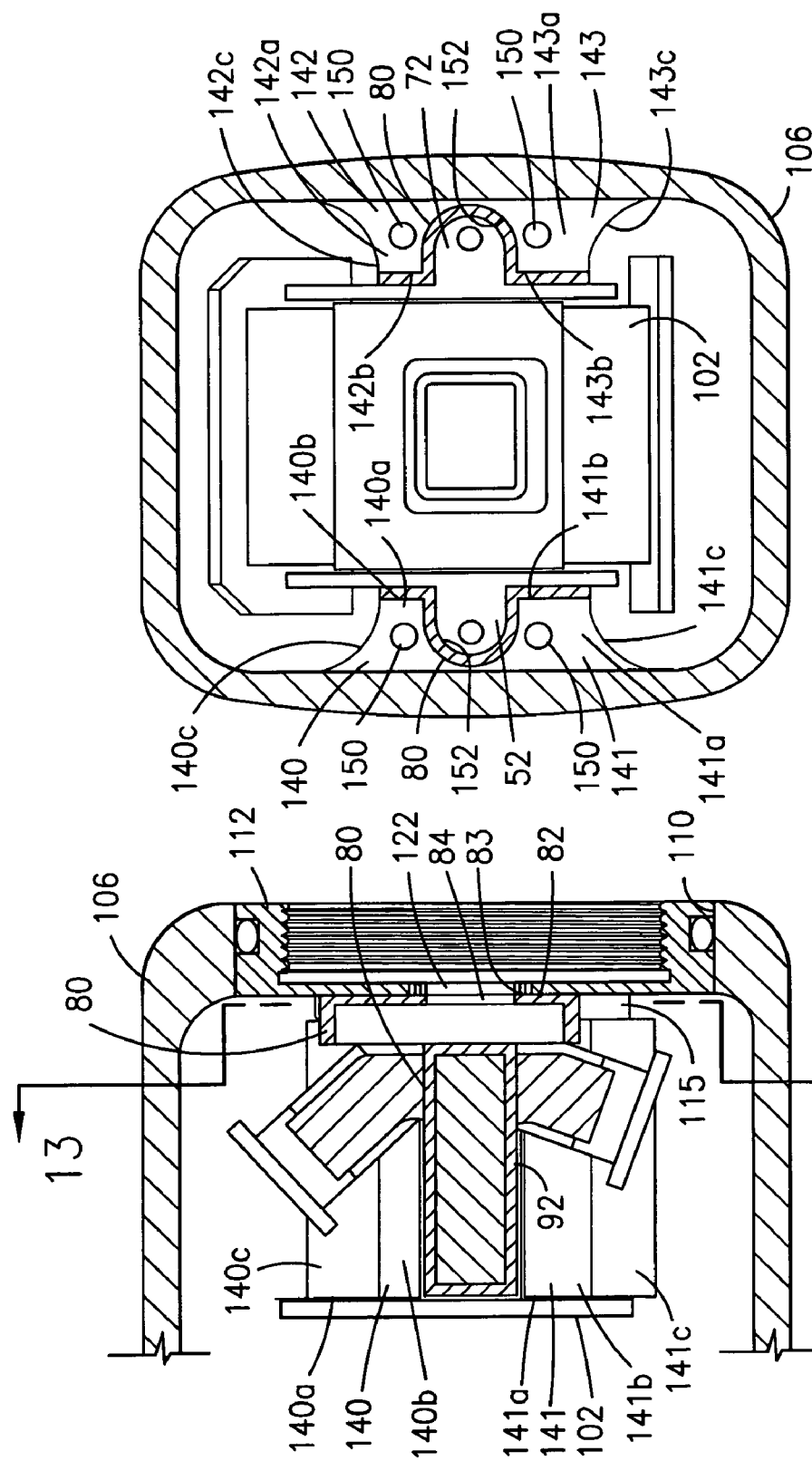

SHOCK MOUNTING SYSTEM FOR CCD CAMERA

BACKGROUND OF THE INVENTION

1. Field of the Invention

The invention relates to shock mounting electronic devices. In particular, the invention relates to shock mounting an imaging device used in an endoscopic video camera.

2. Description of the Prior Art

Over the past fifteen years charged coupled device (CCD) video cameras have come into extensive use in industrial and medical fields. In medical applications these cameras attach to an eyepiece of an optical instrument called an endoscope so that one or more physicians observe on a television monitor what one formerly viewed directly by eye at the endoscope eyepiece. With a diameter of generally less than 10 mm, endoscopes are passed into body cavities through small holes to observe structures and perform procedures previously requiring large surgical openings. Two of the most common types of CCD cameras that are in use in medical surgery today are the single CCD camera and the 3-CCD camera, the latter sometimes called a 3-chip camera. In the case of the 3-CCD camera, light entering the camera from a lens system is separated by a multi-part glass prism assembly, whose optical faces are coated with high and low pass dichroic coatings, such that red light wavelengths of the incoming light image are reflected to one CCD, the blue wavelengths from the image are reflected to a second CCD, and the green wavelengths pass through to a third CCD. The three primary color images from the three CCD's are then recombined to form one color image. The recombined color image has greater line resolution than a comparable single CCD medical camera, and superior color reproduction. The high resolution, superior color video image produced by the 3-CCD camera is favored by some surgeons for use in medical procedures. The negative side of the 3-CCD camera is that it is larger, heavier, more expensive than a single CCD camera, and the adhesive assembled glass prism and CCD assembly is easily damaged by rough handling. Further, the recombination of the three primary color images must be done with extreme accuracy to obtain the improved image resolution and any displacement or breakage of components in the assembly due to shock or thermal distortion severely reduces image resolution or eliminates it entirely, and is virtually unrepairable.

It is accordingly an object of this invention to produce a system to reinforce and mount a 3-CCD assembly to enable it to withstand inadvertent shock loads such as a drop from surgical table height to a hard floor that would normally destroy an unmodified 3-CCD camera.

It is a further object of this invention to produce a system for converting a 3-CCD camera from non-ruggedized form to a ruggedized form.

It is another object of this invention to produce a shock mounting system for a 3-chip camera that is relatively easy to manufacture and repair.

Recently, safety requirements have been established requiring the electrical shielding and isolation of surgical equipment. Accordingly, another object of this invention is to provide a shock mounted 3-chip camera which is electrically isolated from its environment and shielded from being affected by stray electromagnetic radiation or affecting other equipment.

SUMMARY OF THE INVENTION

These and other objects are accomplished by the preferred embodiment disclosed herein which is a shock mounting system for a 3-chip CCD camera comprising a housing containing a camera assembly comprising first, second and third color specific CCD's and associated glass and prism segments. Generally, the system comprises elastomeric means interposed between the camera assembly and the case for absorbing shock forces imposed on the housing prior to their transmission to the camera assembly.

In particular, each CCD and associated glass segment is arrayed adjacent a main prism within a common plane perpendicular to a window in the housing. A pair of symmetrical support plates is used to join the CCD, glass blocks and prism together, one on each side of the camera assembly. Each support plate comprises a first planar leg for being adhered to the first CCD and associated components, a second planar leg, coplanar with the first planar leg, for being adhered to the second CCD and associated components, and a third planar leg, coplanar with the first and second legs, for being adhered to the third CCD and associated components. A support projection extends outwardly from the plane of the first, second and third legs in longitudinal alignment with the CCD viewing direction. An elastomeric boot is interposed between the housing and the support plates. The boot has a front panel having an aperture to permit image access to the main prism and spaced first and second side panels parallel to the common plane for receiving the first and second support projections. Each side panel includes a three sided enclosure to receive the support projection. A transverse stop plate rests at the proximal end of the elastomeric boot adjacent each support projection and the stop plate is secured to the front of the housing by longitudinally extending screws. The camera assembly is thus suspended in the elastomeric boot within the housing between the stop plates and housing.

To comply with various electrical and safety standards, it is necessary to shield the electronic components within the housing from being affected by stray, radiation producing electromagnetic interference (EMI) and to isolate the patient and the user from the electronics. Isolation is provided by using non-conductive plastic housing components and by additionally coating other conductive surfaces with insulating material. EMI shielding is provided by grounded electrical shielding surfaces which are used to block radiated electrical energy. The shielding is itself isolated from the outer surface of the camera by non-conducting materials.

BRIEF DESCRIPTION OF THE DRAWINGS

FIG. 1 is an expanded front perspective view of a 3-CCD camera constructed in accordance with the principles of this invention.

FIG. 2 is an expanded rear perspective view of FIG. 1.

FIG. 7 is a side elevation view of the assembly of FIG. 4 shown with a side support plate spanning all adhesive joints in the assembly except the joint between the front support plate and the glass prism immediately adjacent to it.

FIG. 8 is a front elevational view of the assembly of FIG. 7.

FIG. 12 is a diagrammatic side elevation cross-section view of the components of FIG. 8 assembled with the elastomeric boot of FIG. 6 and the case of FIG. 1.

FIG. 13 is a sectional diagrammatic view of FIG. 12 taken generally along the line 13—13 with some components omitted for clarity.

DESCRIPTION OF THE PREFERRED EMBODIMENT

Figure 4:
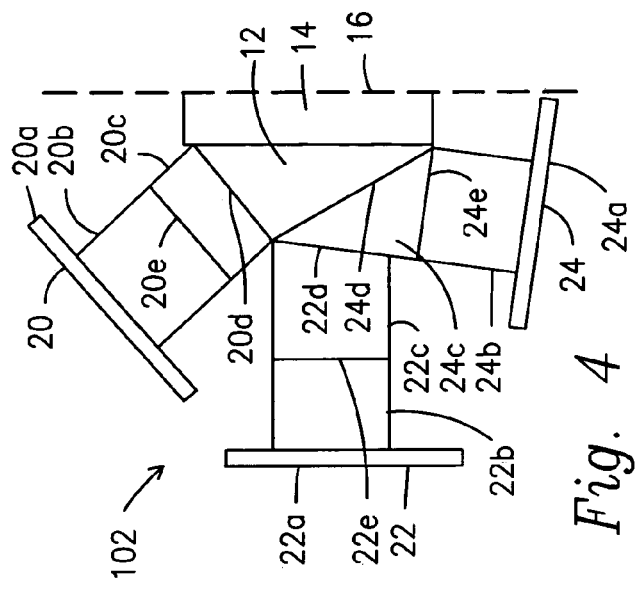
FIG. 4 is a diagrammatic side elevation view of an unmodified 3-CCD/glass prism assembly.

A representative 3-chip camera constructed in accordance with the principles of this invention is shown in FIGS. 1 and 2. Camera 100 comprises a CCD/prism camera assembly 102 with an associated electronics assembly 104 to operate the camera assembly in a conventional manner (electronics assembly 104 forms no part of this invention). The assemblies 102 and 104 are part of a 3-chip camera produced in a conventional manner which results in a non-ruggedized design. (Part of electronics assembly 104 is not included in the non-ruggedized version of the CCD camera, but is not further discussed here because it forms no part of this invention.) The invention converts this existing camera to a ruggedized version as embodied by camera 100. Camera 100 comprises a housing 101 comprising 4-sided front case 106 to receive the camera assembly and other internal components discussed below, a cover 108 to encase all of the components and help to create a hermetically sealed enclosure and a C-mount 112 discussed below. The cover has an aperture 110 for electrically connecting the camera to associated components via a cable (not shown). The front of camera case 106 comprises an aperture 110 which receives C-mount 112 for threadably connecting the camera 100 to an associated endoscope such as, in particular, an arthroscope (not shown). In the preferred embodiment, an optical coupler or similar device is interposed between the camera and endoscope. As best seen in FIG. 2, and as further described below, the back of C-mount 112 is provided with threaded holes 114 for receiving mounting screws 116 to thereby secure and align the camera assembly 102 and C-mount 112 together. C-mount 112 includes an aperture 122 to enable the image conveyed to the camera by the scope (and optical coupler) optics to be viewed by the camera assembly 102. The case 106 and cover 108 are made of plastic (such as Ultem®) to provide electrical isolation (discussed below) and reduce weight. C-mount 112 is made of aluminum, but is electrically isolated by the plastic housing and the elastomeric boot discussed below. EMI shielding is provided by coating the interiors of case 106 and cover 108 with a grounded layer of electrically conductive material.

Referring now to FIG. 4 there is shown a side elevation view of a 3-chip camera assembly 102. Camera assembly 102 comprises a main prism 12 secured to a mounting member 14 having an aperture 16 (best seen in FIG. 8), for alignment with aperture 122, through which an image is received and divided among the three CCD assemblies 20, 22 and 24. The assemblies are set at predetermined angles within a common plane perpendicular to aperture 16 and each assembly comprises various components such as printed circuits 20a, 22a, 24a, CCD's 20b, 22b, 24b and intermediate glass blocks 20c, 22c, 24c (for path length equalization). The normal manufacturing process utilizes adhesives to bond the various CCD/glass/prism faces together at junctions 20d, 22d, 24d and 20e, 22e and 24e.

The camera assembly 102 has the structure shown in FIG. 4 because it is used in a prior art, non-ruggedized version of a 3-chip camera wherein mounting plate 14 is designed to mount the camera assembly in a housing (not shown) in cantilevered fashion. The cantilevered structure is believed to make the camera susceptible to shock loads. As will be understood, the invention modifies this non-ruggedized version to remove reliance upon the support provided by block 14 and creates a new housing with new support surfaces.

Figure 6:
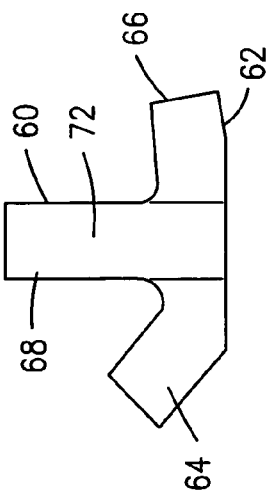
FIG. 6 is a front elevation view of a left side support plate.
Figure 5:
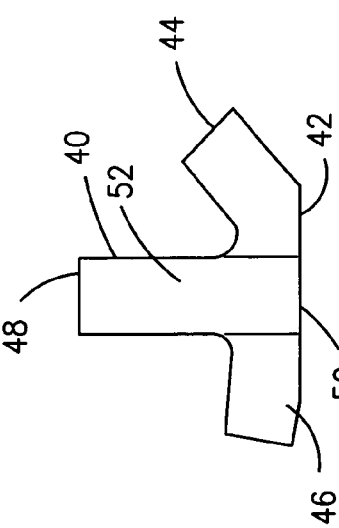
FIG. 5 is a front elevation view of a right side support plate.
Figure 10:
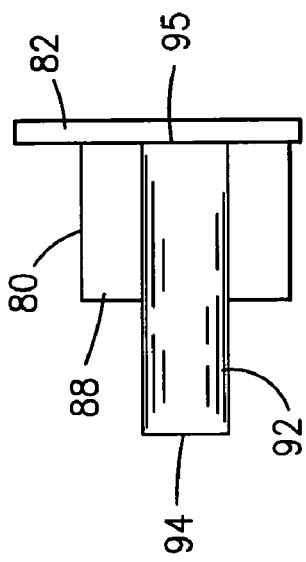
FIG. 10 is a right side elevation view of FIG. 9.
Figure 11:
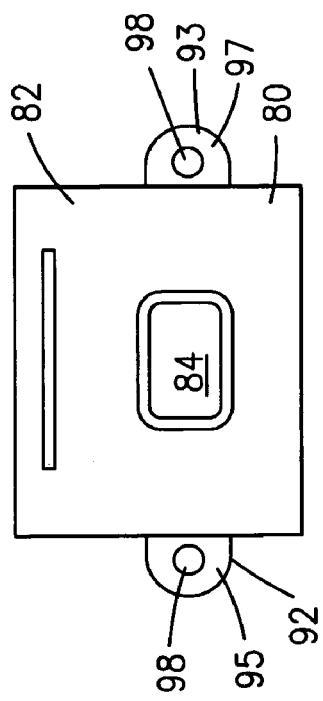
FIG. 11 is a front elevation view of FIG. 9.
Figure 9:
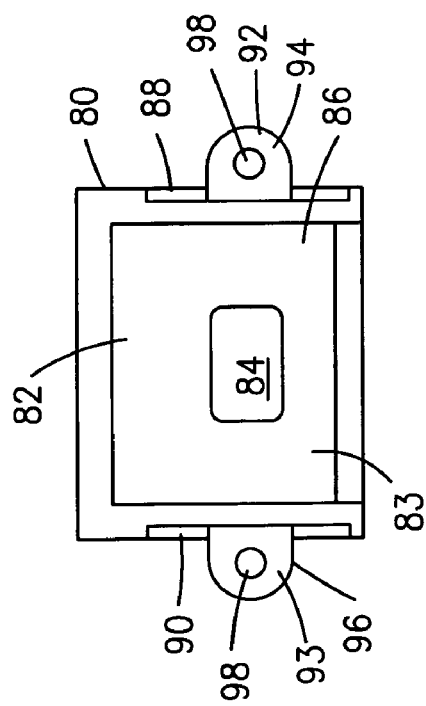
FIG. 9 is a rear elevation view of an elastomeric boot molded to fit the assembly of FIG. 7.

FIGS. 5 and 6 show symmetric right side and left side interface brackets, or support plates 40 and 60, respectively. FIG. 5 shows the plate 40 intended to cover the surfaces shown in FIG. 4 while FIG. 6 shows the support plate 60 intended to cover the surfaces on the opposite side of those visible in FIG. 4. Right side support plate 40 comprises a generally planar body 42 having outwardly extending legs 44, 46 and 48 extending in particular orientations relative to each other to correspond to the three CCD assemblies. Similarly, left side support plate 60 has a planar body 62 and legs 64, 66 and 68. As will be noted below, each leg is intended to be aligned with and adhere to the components of a particular CCD assembly. The legs must be large enough to provide an adequate bonding surface and aid in the dimensional stability of the assembly. The legs should conform to the shape of the surfaces of the CCD assemblies and, in the preferred embodiment, the legs are, therefore, in a planar array. Other shapes and other methods of attachment may be suitable. Each support plate 40 and 60 has a semi-cylindrical extension 52 and 72, respectively, aligned with its main, longitudinally aligned legs, having throughbores 54 and 74, respectively (best seen in FIG. 8). FIG. 7 shows an elevational view of the assembly of FIG. 4 with the right side support plate 40 in place. The assembly with support plates is best visualized by reference to FIGS. 7 and 8 showing the representative areas covered by the support plates and their alignment along the center of gravity of assembly 102. The semi-cylindrical extensions 52 and 72 comprise the new support surfaces for the camera assembly. In the preferred embodiment these extensions are longitudinally extending in order to enable them to be suspended between transverse proximal and distal surfaces, as will be understood below.

In the preferred embodiment, the support plates are made of a steel alloy known as kovar because of its thermal characteristics which allow thermal expansion/contraction (imposed on the system by sterilization processes) without destroying the integrity of assembly 102. Kovar is a material which has a dimensional stability (coefficient of thermal expansion) very close to that of the glass in the prism and the CCD chip. The plates are preferably bead-blasted to improve adhesion to the assembly.

The invention also comprises an elastomeric boot 80 designed to be interposed between camera assembly 102 and all surfaces adjacent to it so that the assembly will be suspended within the housing. It will be understood that the boot provides electrical isolation as well as shock mounting. Boot 80 comprises a front panel 82 having an aperture 84 for alignment with aperture 16 in order to allow visual access to camera assembly 102. The rear side of front panel 82 also has a recess to receive the sides of mounting surface 14 to thereby absorb lateral shocks to the mounting surface 14 relative to boot 80. A pair of side panels 88 and 90 extend rearwardly from front panel 82 and are integrally formed with a pair of hollowed-out semi-cylindrical extensions 92 and 93. Extension 92 has transverse surfaces 94 and 95 at its proximal and distal ends, respectively, and extension 93 has similar transverse surfaces 96 and 97. Each transverse surface has a longitudinally aligned aperture. It will be understood that extensions 92 and 94 are molded in order to receive therein semi-cylindrical extensions 52 and 72 of the side support plates. The boot extensions, therefore, cover all surfaces of the semi-cylindrical extensions except those in contact with the CCD assembly. In the preferred embodiment, boot 80 is molded from a silicone having a Shore diameter of 15–30, preferably 20. This has been found soft enough to absorb shock loads when the panels are made relatively thin, and firm enough to maintain the CCD window 16 in alignment with aperture 122 of the C-mount. Front panel 82 is approximately 0.025 inches (0.635 mm) thick in the area of recess 83 while the remaining panels are approximately 0.035 inches (0.889 mm) thick.

Figure 3:
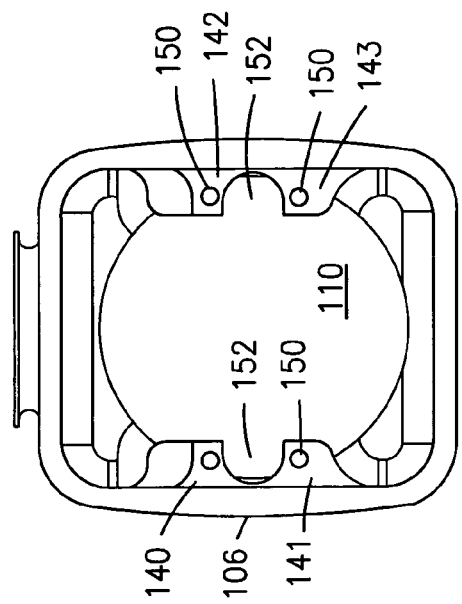
FIG. 3 is a rear elevation view of the interior of the camera housing shown in FIGS. 1 and 2.

As best seen in FIGS. 1–3, the actual connection of the camera assembly to the camera housing is accomplished by resiliently holding the modified camera assembly (i.e. with support plates and elastomeric boot) within the housing between a pair of rectangular stop plates 130, 131 and the back of C-mount 112. The stop plates are each made of an insulating material (such as Ultem®) and each have a pair of spaced screw receiving apertures 134, 135 and a central alignment aperture 136. The stop plates rest on the tops of internal bosses 140, 141 on one internal side of case 106 and 142, 143 on the other diametrically opposed side. Each boss has a throughbore 150 and each pair of bosses 140, 141 and 142, 143 is transversely spaced by a longitudinally extending clearance slot 152. As best seen in FIGS. 12 and 13, bosses 140–143 have flat transverse top surfaces 140a, 141a, 142a and 143a, flat longitudinally extending surfaces 140b, 141b, 142b and 143b, and curved longitudinally extending surfaces 140c, 141c, 142c and 143c. The stop plates are intended to rest on the flat top surfaces and, therefore, the length of each boss 140, 141 extends from boss 115 proximally to stop plates 130 and 131. The modified camera assembly is intended to fit within slots 152 to thereby be held laterally in place, as best seen in FIG. 13, and is longitudinally held in place by the cooperative action of stop plates 130, 131 and C-mount 112. A screw 116 is received within holes 134 and 135 in each stop plate which in turn is situated at its central portion (around alignment aperture 136) adjacent the proximal end of an associated semi-cylindrical extension of the boot 80 and holds the boot and the support plates within the boot fixed relative to the front of the housing. The distal ends of the screws are received in threaded holes 114 in C-mount 112, the holes being situated in a pair of diametrically opposed bosses 115 on the back of the C-mount (only one of which is shown in FIG. 2). It will be understood that the distal ends of semi-cylindrical extensions 92 and 93, therefore, rest against bosses 115 on the inside of the C-mount between holes 154, 155. A series of alignment apertures is used to ensure proper alignment of all components during assembly. The holes 98 in the boot semi-cylindrical extensions and the bores 54 and 74 are part of this alignment mechanism and receive alignment pins (not shown) during the assembly of the camera to assure that the components are properly aligned. That is, an alignment pin extends through aligned apertures 136, 98 and 155 on each side of the camera and is removed after screws 116 are secured.

Isolation and EMI shielding of the camera are achieved by ensuring that the camera assembly is encased as much as possible within a grounded enclosure and by ensuring that the camera assembly is suspended within, and contacts only non-electrically conductive materials.

Electrical isolation of the camera assembly 102 is achieved because it is suspended within the non-conductive elastomeric boot on all sides where it might contact the housing. Furthermore, the attachment of the boot by the non-conductive stop plates also contributes to the isolation. Finally, since the interior of the case 106 is coated with electrically conductive material, to additionally contribute to electrical isolation the shank of each of the screws 116 is wrapped in insulating tape (such as Kapton®).

EMI shielding is achieved by, as mentioned above, coating the interior of the housing with a grounded electrically conductive layer except for the aluminum C-mount and cable aperture 110 of back cover 108. These elements are not coated because to do so would compromise the ability to meet the safety standards for electrical isolation of the patient and user. The coatings on the case 106 and cover 108 are electrically connected by a conventional contact spring/groove mechanism and grounding is provided through a shielded cable in aperture 110. The coating on the case stops short of contacting the C-mount in order to maintain isolation. While the C-mount is, therefore, not grounded, it is in contact only with plastic components and is isolated from all surrounding conductive surfaces as described above. The degree to which the C-mount produces an ungrounded conductive part of housing 101 is not so great as to prevent the camera from meeting EMI shielding specifications.

FIGS. 12 and 13 show that boot 80 is interposed between case 106 and assembly 102 at all longitudinally and laterally extending points by filling the gap between the longitudinally extending slots 152 and adjacent flat surfaces 140b, 141b, 142b and 143b. Bosses 140, 141 have been shown in FIG. 12 but the portion of boot 80 covering flat boss surfaces 140b and 141b have been omitted for clarity. It will be understood that the bosses extend substantially the length of semi-cylindrical extensions 92, 93 so that the distal transverse surfaces 95 and 97 abut bosses 15 on the C-mount. The front of panel 82 contacts the rear wall of C-mount 112 surrounding aperture 122 and a rim 83 fits within the aperture to further isolate and secure the assembly 102. As shown in FIG. 13, boot 80 absorbs lateral shock loads by being interposed between assembly 102 and the bosses 140–143.

It will be understood by those skilled in the art that numerous improvements and modifications may be made to the preferred embodiment of the invention disclosed herein without departing from the spirit and scope thereof.

What is claimed is:

1. A shock mounting system for a 3-chip CCD camera assembly comprising a mounting member having a first light transmitting aperture and first, second and third color specific CCD's and associated component segments for receiving an image through said first aperture, each said CCD and associated component segments arrayed adjacent a main prism within a common plane perpendicular to said first aperture, said system comprising:
   a pair of symmetrical support plates, one on each side of said common plane, each support plate comprising:
   a first leg for being secured to said first CCD and associated components;
   a second leg for being secured to said second CCD and associated components;
   a third leg for being secured to said third CCD and associated components;
   a support projection extending from said first, second and third legs;
   a housing for receiving said camera assembly therein, said housing comprising a pair of opposed support projection receiving slots for receiving said support projections and means for resiliently securing said support projections within said housing; and an elastomeric boot interposed between said securing means and said support plates comprising:
- a front panel for receiving said mounting member of said camera assembly, said front panel having a second light transmitting aperture to permit image access to said main prism through said first aperture;
- transversely spaced first and second side panels parallel to said common plane for receiving said first and second support projections;
- a pair of longitudinally spaced, transversely extending enclosing panels perpendicular to each of said first and second side panels for forming therewith a pair of spaced three sided enclosures to receive said support projections.

2. A shock mounting system according to claim 1 wherein said resiliently securing means comprises:
- a pair of transverse stop plates for abutting an opposed pair of said enclosing panels and for limiting longitudinal motion of said camera assembly, each stop plate having a pair of spaced apertures therein;
- a plurality of screws for being received individually in said spaced apertures;
- a plurality of opposed transverse boss surfaces within said housing to abut said stop plates;
- means for abutting the other opposed pair of said enclosing panels to limit longitudinal motion of said camera assembly;
- a plurality of screw receiving bores in the front of said housing for receiving said screws to thereby hold said stop plates against said boss surfaces and suspend said camera assembly within said elastomeric boot and between said stop plates and said abutting means.

3. A shock mounting system according to claim 2 further comprising longitudinally extending support surfaces for abutting said first and second side panels.

4. A shock mounting system according to claim 2 further comprising an alignment throughbore in each of said support projections, said throughbores aligned with said common plane, an alignment aperture in each said stop plate and in each said enclosing panel in alignment with said throughbore in said support projection and an alignment bore in the front of said housing.

5. A shock mounting system according to claim 1 wherein said support plates are produced from kovar.

6. A shock mounting system according to claim 1 wherein said first, second and third legs are co-planar.

7. A shock mounting system according to claim 1 further comprising planar side panel extensions integrally formed with said first and second side panels of said elastomeric boot.

8. A shock mounting system according to claim 1 further comprising electrical isolation means for isolating said camera assembly from said housing.

9. A shock mounting system according to claim 8 wherein said housing is made of a non-electrically conductive material.

10. A shock mounting system according to claim 9 wherein said housing is coated on at least a portion of its interior surface with an electrically conductive material and wherein said electrically conductive material is connected to ground.

11. A shock mounting system according to claim 10 further comprising interposing electrically non-conductive materials between said camera assembly and said housing.

12. A shock mounting system for a 3-chip CCD camera comprising a housing containing a camera assembly comprising first, second and third color specific CCD's and associated components, each said CCD and associated component arrayed adjacent a main prism within a common plane perpendicular to a light transmitting aperture in said housing, said system comprising:
- elastomeric means interposed between said camera assembly and said housing for absorbing shock imposed on said case prior to their transmission to said camera assembly; and
- at least one transverse stop plate and a plurality of screws for being longitudinally received in said stop plate parallel to said common plane and perpendicular to said light transmitting aperture.

* * * * *